United States Patent
Lee et al.

(10) Patent No.: US 10,892,446 B2
(45) Date of Patent: Jan. 12, 2021

(54) RECHARGEABLE BATTERY AND MANUFACTURING METHOD THEREOF

(71) Applicant: SAMSUNG SDI CO., LTD., Yongin-si (KR)

(72) Inventors: Jongha Lee, Yongin-si (KR); Junsun Yong, Yongin-si (KR)

(73) Assignee: Samsung SDI Co., Ltd., Yongin-Si (KR)

( * ) Notice: Subject to any disclaimer, the term of this patent is extended or adjusted under 35 U.S.C. 154(b) by 915 days.

(21) Appl. No.: 14/824,314

(22) Filed: Aug. 12, 2015

(65) Prior Publication Data

US 2016/0049618 A1 Feb. 18, 2016

(30) Foreign Application Priority Data

Aug. 13, 2014 (KR) ........................ 10-2014-0104862

(51) Int. Cl.
| | |
|---|---|
| *H01M 2/02* | (2006.01) |
| *H01M 10/0525* | (2010.01) |
| *H01M 2/26* | (2006.01) |
| *H01M 2/04* | (2006.01) |
| *H01M 2/30* | (2006.01) |
| *H01M 2/06* | (2006.01) |

(52) U.S. Cl.
CPC ......... *H01M 2/0202* (2013.01); *H01M 2/021* (2013.01); *H01M 2/0404* (2013.01); *H01M 2/06* (2013.01); *H01M 2/263* (2013.01); *H01M 2/30* (2013.01); *H01M 10/0525* (2013.01); *H01M 2220/30* (2013.01)

(58) Field of Classification Search
CPC ......... H01M 10/0525; H01M 2220/30; H01M 2/0202; H01M 2/021; H01M 2/0404; H01M 2/06; H01M 2/263; H01M 2/30
See application file for complete search history.

(56) References Cited

U.S. PATENT DOCUMENTS

| | | | |
|---|---|---|---|
| 7,972,185 | B2 | 7/2011 | Kim |
| 8,501,346 | B2 | 8/2013 | Byun et al. |
| 9,252,401 | B2 | 2/2016 | Kim |

(Continued)

FOREIGN PATENT DOCUMENTS

| | | |
|---|---|---|
| EP | 2 230 705 A1 | 9/2010 |
| EP | 2 388 844 A1 | 11/2011 |

(Continued)

OTHER PUBLICATIONS

Extended European Search Report dated Jan. 7, 2016 in Corresponding European Patent Application No. 15180827.6.

(Continued)

*Primary Examiner* — Lingwen R Zeng
(74) *Attorney, Agent, or Firm* — Lee IP Law, PC (57) ABSTRACT

A secondary battery includes an electrode assembly, a can, a cap plate, an insulating plate, and a terminal plate. The electrode assembly is in the can. The cap plate seals an opening of the can and includes a first hole. The insulating plate is on a lower surface of the cap plate and includes a second terminal through hole. The terminal plate is on a lower surface of the insulating plate and includes a third terminal through hole and at least one protrusion adjacent the third terminal through hole.

8 Claims, 6 Drawing Sheets

(56) References Cited

U.S. PATENT DOCUMENTS

| | | | |
|---|---|---|---|
| 2001/0004505 A1* | 6/2001 | Kim | H01M 10/0587 |
| | | | 429/180 |
| 2006/0093907 A1* | 5/2006 | Jeon | H01M 2/0404 |
| | | | 429/180 |
| 2007/0154783 A1 | 7/2007 | Jeon | |
| 2007/0154802 A1* | 7/2007 | Uh | H01M 2/0404 |
| | | | 429/180 |
| 2008/0160393 A1 | 7/2008 | Kim et al. | |
| 2009/0202901 A1* | 8/2009 | Okuda | H01M 2/0426 |
| | | | 429/175 |
| 2014/0017555 A1 | 1/2014 | Yun | |
| 2014/0242440 A1 | 8/2014 | Yamada et al. | |

FOREIGN PATENT DOCUMENTS

| | | |
|---|---|---|
| EP | 2 495 784 A2 | 9/2012 |
| KR | 10-2007-0006091 A | 1/2007 |
| KR | 10-0719728 B1 | 5/2007 |
| KR | 10-2008-0072132 A | 8/2008 |
| KR | 10-2010-0105340 A | 9/2010 |
| KR | 10-2012-0100477 A | 9/2012 |
| KR | 10-2011-0128084 A | 8/2013 |
| KR | 10-2014-0008236 A | 1/2014 |

OTHER PUBLICATIONS

European Office Action dated May 17, 2019.
Korean Office action dated Oct. 29, 2020.

* cited by examiner

RECHARGEABLE BATTERY AND MANUFACTURING METHOD THEREOF

CROSS-REFERENCE TO RELATED APPLICATION

Korean Patent Application No. 10-2014-0104862, filed on Aug. 13, 2014, and entitled: "Rechargeable Battery and Manufacturing Method Thereof," is incorporated by reference herein in its entirety.

BACKGROUND

1. Field

One or more embodiments described herein relate to a rechargeable battery and a method for manufacturing a rechargeable battery.

2. Description of the Related Art

With the development of wireless Internet and communication technologies, battery-operated portable electronic devices which do not use a separate power supply have been developed. Examples of these devices include small, easy-to-carry portable computers used for business or personal reasons.

A secondary battery may be employed in the portable computer to allow computer to be used anywhere, regardless of the availability of power supplies. Such a secondary battery may include a plurality of unit batteries that are repeatedly charged and discharged in order to supply enough power.

SUMMARY

In accordance with one embodiment, a secondary battery includes an electrode assembly including a separator between a first electrode plate and a second electrode plate; a can including the electrode assembly and an opening; a cap plate to seal the opening of the can and including a first terminal through hole; an insulating plate on a lower surface of the cap plate and including a second terminal through hole; and a terminal plate on a lower surface of the insulating plate and including a third terminal through hole and at least one protrusion adjacent the third terminal through hole.

The terminal plate may include a first surface which includes the at least one protrusion and a second surface which contacts the insulating plate, and the first surface may be opposite to the second surface. The electrode pin may be on an upper surface of the cap plate and may be inserted into the first, second, and third terminal through holes. The electrode pin may include an upper portion on the upper surface of the cap plate, a lower portion on a lower surface of the terminal plate, and a connecting portion to connect the upper portion and the lower portion. The lower portion of the electrode pin may interlock with the at least one protrusion of the terminal plate.

The at least one protrusion may have a substantially circular shape and surrounds the third terminal through hole. The at least one protrusion may include a plurality of protrusions adjacent the third terminal through hole. The protrusions may be radially arranged relative to the third terminal through hole.

In accordance with another embodiment, a method for manufacturing a secondary battery includes inserting an electrode assembly into a can; forming a cap assembly by (a) arranging a cap plate, an insulating plate on a lower surface of the cap plate, and a terminal plate on a lower surface of the insulating plate in a stack, and (b) inserting an electrode pin into terminal through holes in the cap plate, the insulating plate, and the terminal plate; and sealing the can with the cap assembly, wherein at least one protrusion is located on a surface of the terminal plate and is adjacent one of the terminal through holes.

The electrode pin may include a metallic material, and the method ma includes forming an end of the electrode pin by a spinning method, wherein (b) includes inserting the end of the electrode pin into the terminal through holes of the cap assembly based on malleability of the metallic material. Also, (b) may include interlocking the end of the electrode pin with the at least one protrusion of the terminal plate.

In accordance with another embodiment, a cap assembly for a battery includes a cap plate including a first hole; an insulating plate on the cap plate and including a second hole; and a terminal plate on the insulating plate and including a third hole and at least one protrusion adjacent the third hole, wherein the at least one protrusion has a first shape to be coupled to a second shape of an electrode pin. The first shape may be complementary to the second shape.

The first, second, and third holes may have first diameters to accommodate the electrode pin, which may have a second diameter less than each of the first diameters. The at least one protrusion may include a plurality of protrusions to be coupled to the second shape of the electrode pin. The plurality of protrusions may have the first shape. The cap plate may include at least one anchor to fix a position of the insulating plate. The insulating plate may include a recess which includes the at least one anchor. The cap assembly may include a gasket in at least one of the first, second, or third holes. The at least one protrusion may surround the third hole.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. In the drawings, the dimensions of layers and regions may be exaggerated for clarity of illustration. Like reference numerals refer to like elements throughout.

Figure 1:
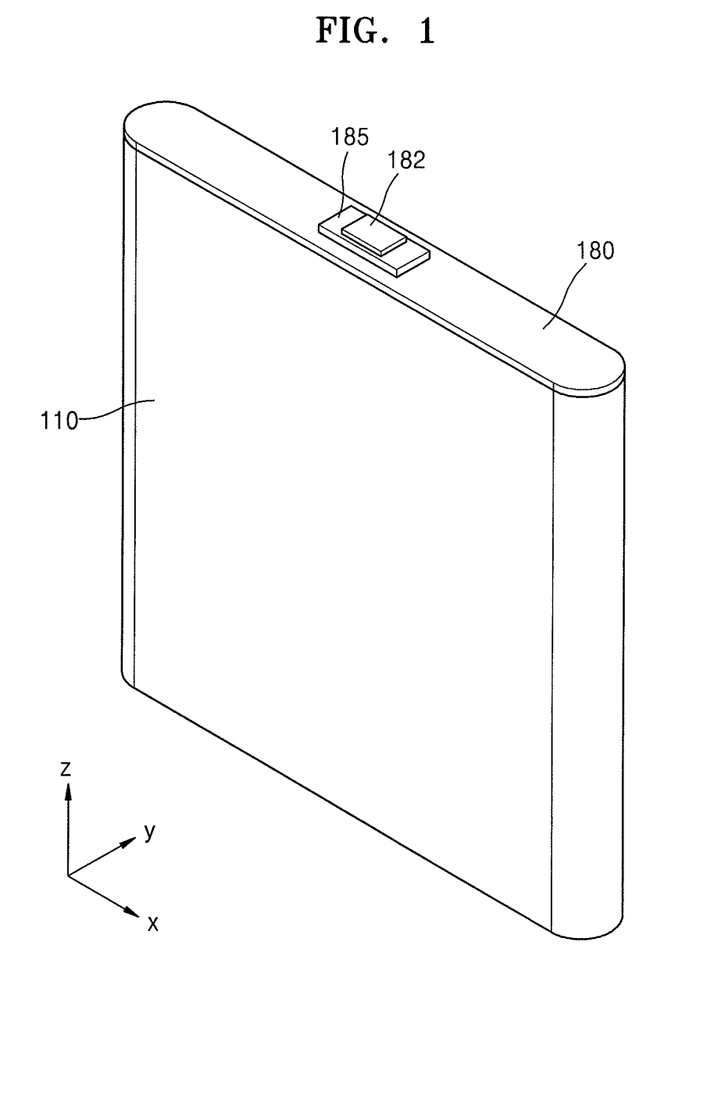
FIG. 1 illustrates an embodiment of a secondary battery.
Figure 2:
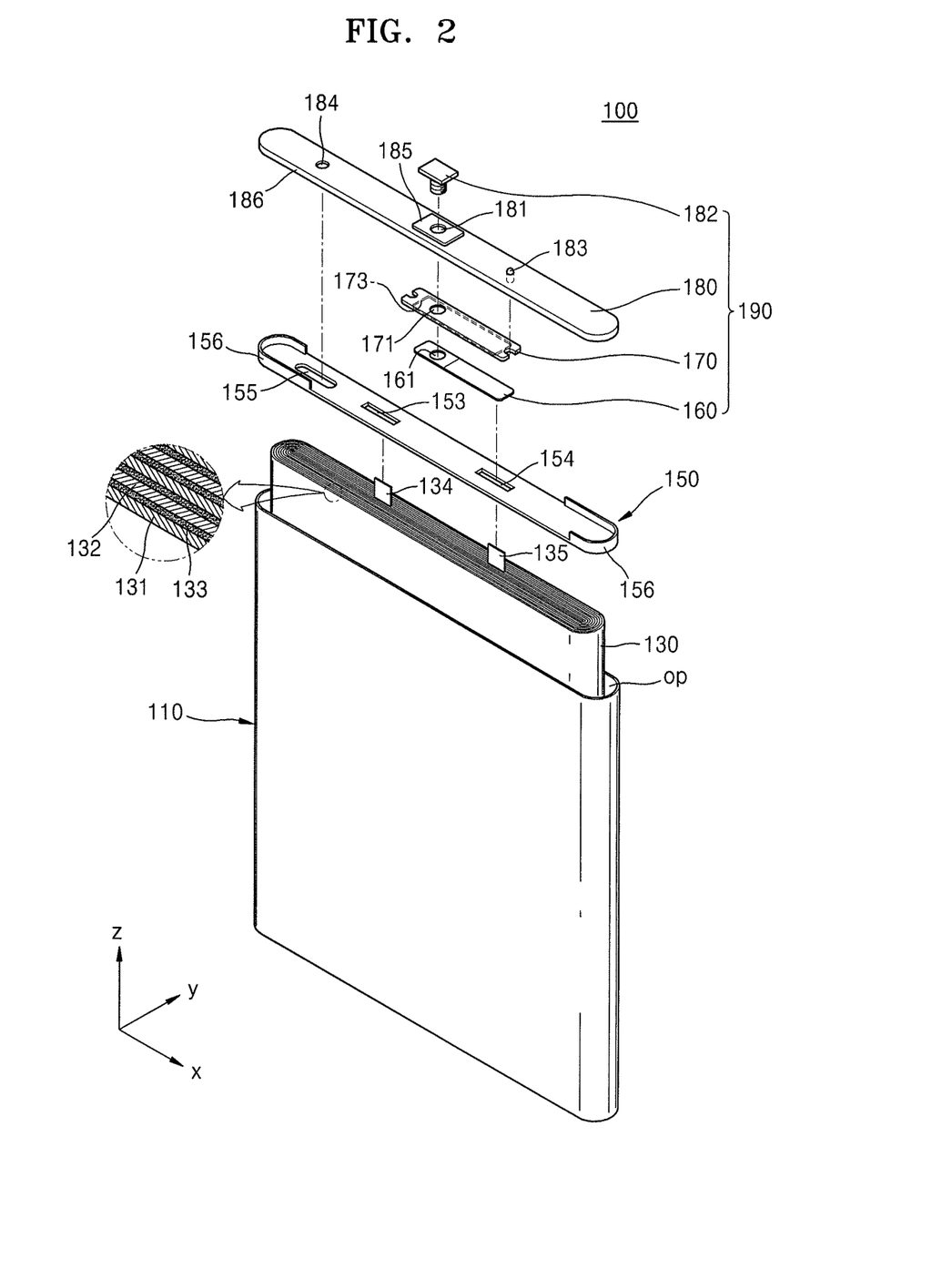
FIG. 2 illustrates an exploded view of the secondary battery.
Figure 3:
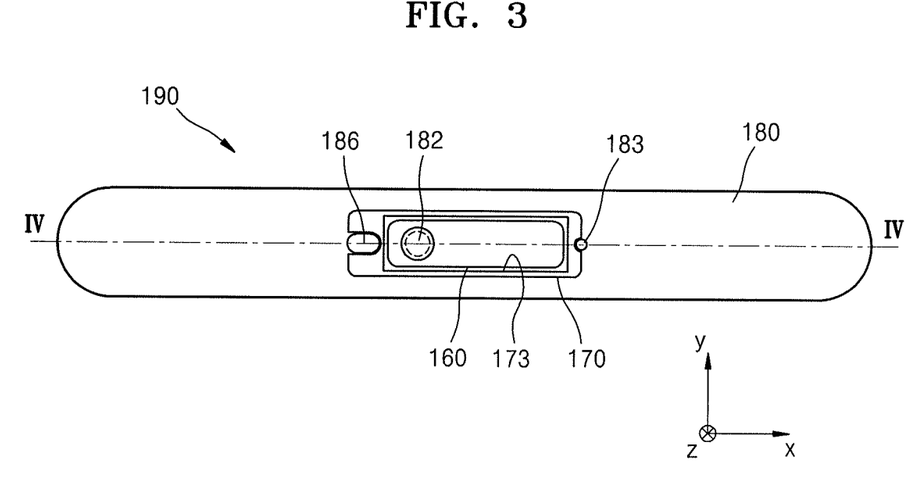
FIG. 3 illustrates an embodiment of a cap assembly.

FIG. 1 illustrates an embodiment of a secondary battery 100, FIG. 2 illustrates an exploded view of the secondary battery 100, and FIG. 3 illustrates a bottom view of a cap assembly 190 of the secondary battery 100.

Referring to FIGS. 1 to 3, the secondary battery 100 includes a can 110, an electrode assembly 130, an insulating case 150, and a cap assembly 190. The secondary battery 100 may be rechargeable and may be, for example, a lithium-ion battery.

The can 110 has an opening OP on one side thereof and has an internal space surrounded by a side wall. The electrode assembly 130 is inserted through the opening OP. Thus, the can 110 may house the electrode assembly 130.

The can 110 has a predetermined shape and an upper portion thereof is open. The predetermined shape may be, for example, a hexahedron shape. In other embodiments, the can 110 may have another shape. The can 110 may be formed of aluminum (Al) or Al alloy. After the electrode assembly 130 is inserted into the can 110 via the opening OP, the opening OP may be sealed by the cap assembly 190.

The cap assembly 190 includes a terminal plate 160, an insulating plate 170, a cap plate 180, and electrode pin 182 which is inserted into the terminal plate 160, the insulating plate 170, and the cap plate 180. The cap plate 180 may be formed, for example, of metallic materials such as Al or Al alloy, which may be the same as the can 110. The cap plate 180 and the can 110 may be joined, for example, by laser welding to form an internal airtight coupling.

The electrode assembly 130 may include a first electrode layer 131, a second electrode layer 132, and a separator 133 between the first electrode layer 131 and the second electrode layer 132. The electrode assembly 130 may have a structure in which a plurality of first electrode layers 131, second electrode layers 132, and separators 133 are stacked, or a jelly-roll structure in which the first electrode layer 131, the second electrode layer 132, and the separator 133 are wrapped. A case where the electrode assembly 130 has a jelly-roll structure is described for illustrative purposes.

The first electrode layer 131 may be any one of an anode film or a cathode film. When the first electrode layer 131 is an anode film, the second electrode layer 132 is a cathode film. Conversely, when the first electrode layer 131 is a cathode film, the second electrode layer 132 is an anode film. That is, the first electrode layer 131 and the second electrode layer 132 have polarities which are electrically different from each other. The polarities are not limited to certain polarities. A case where the first electrode layer 131 is an anode film and the second electrode layer 132 is a cathode film is described for illustrative purposes.

The first electrode layer 131 may include a first metal collector and a first active material portion on which a first active material is spread. The first active material may be spread on a portion or an entire surface of the first metal collector. Likewise, the second electrode layer 132 may include a second metal collector and a second active material portion on which a second active material is spread. The second active material may be spread on a portion or an entire surface of the second metal collector.

The first electrode layer 131 is the anode film, the first metal collector is an anode collector, and the first active material portion may be an anode active material portion. The second electrode layer 132 is the cathode film, the second metal collector is a cathode collector, and the second active material portion may be a cathode active material portion. Materials and structures of the anode collector, the anode active material portion, the cathode collector, and the cathode active material portion may include various predetermined materials.

The separator 133 may be a porous polymer film, or may be woven fabrics or non-woven fabrics including polymer fibers. Also, the separator 133 may include ceramic particles and may be formed of a polymer solid electrolyte. For example, the separator 133 may be formed of polyethylene (PE), polypropylene (PP), etc. The separator 133 may be used as a separate film or formed as a non-conductive porous layer on the first electrode layer 131 or the second electrode layer 132.

The separator 133 electrically separates the first electrode layer 131 and the second electrode layer 132. The separator 133 may have a shape identical or complementary to a shape of the first electrode layer 131 or the second electrode layer 132, or may have a different shape.

The electrode plates include a first electrode plate 134 and a second electrode plate 135 having different properties. The electrode plates 134 and 135 electrically connect the electrode assembly 130 to an external device. The first electrode plate 134 is electrically connected to the first electrode layer 131, thus having an anode. The second electrode plate 135 is electrically connected to the second electrode layer 132, thus having a cathode.

The insulating case 150 is between the electrode assembly 130 and the cap assembly 190, and electrically insulates the electrode assembly 130 from the cap assembly 190. The insulating case 150 is inside the opening OP of the can 110, which houses the electrode assembly 130.

Also, supports 156 may be formed at ends of the insulating case 150. The insulating case 150 may be stably disposed in the can 110 using the supports 156. FIG. 2 shows that the supports 156 are formed at the ends of the insulating case 150, but the supports 156 may extend along a circumference of the insulating case 150 in another embodiment.

Because the insulating case 150 electrically insulates the electrode assembly 130 from the cap assembly 190, the insulating case 150 may be formed, for instance, of insulative polymer resins. Examples of insulative polymer resins include but are not limited to PP, PE, polyimide (PI), polyphenylenesulfide (PPS), polyethersulfone (PES), and polyphenyleneoxide (PPO).

The cap assembly 190 may include a cap plate 180, an insulating plate 170, a terminal plate 160, and an electrode pin 182. The cap plate 180 seals the opening OP of the can 110 and protects the electrode assembly 130 inside the can 110. The shape of the cap plate 180 may be the same as the opening OP of the can 110.

The electrode pin 182 may be arranged on the cap plate 180. In this case, a gasket 185 may be between the electrode pin 182 and the cap plate 180 to prevent a short between the electrode pin 182 and the cap plate 180. The gasket 185 may include an insulative material to prevent an electrical short between the electrode pin 182 and the cap plate 180.

The electrode pin 182 is arranged at a predetermined location on the cap plate 180. The predetermined location may be, for example, the center of the cap plate 180. Based on the electrode pin 182, an anchor 183 is on one end of the cap plate 180, and an electrolyte injection hole 184 may be at another end of the cap plate 180. In another embodiment, the electrode pin 182 may be located at a location different from the center of the cap plate 180.

The electrode pin 182 may be electrically connected to the second electrode plate 135, via a first terminal through hole 181 arranged at the center of the cap plate 180. For example, the first electrode plate 134 is electrically connected to the cap plate 180, and the second electrode plate 135 is electrically connected to the electrode pin 182. Because the first electrode plate 134 and the second electrode plate 135 have different polarities, the cap plate 180 and the electrode pin 182 (which are respectively connected to the first electrode plate 134 and the second electrode plate 135) also have different polarities. For example, the cap plate 180 may have a positive polarity, and the electrode pin 182 may have a negative polarity. Therefore, the gasket 185 is between the cap plate 180 and the electrode pin 182 to prevent a short between the cap plate 180 and the electrode pin 182.

The electrolyte injection hole 184 (used to inject electrolyte into the sealed can 110) may be formed and be sealed by a sealing cap after the electrolyte is injected.

The terminal plate 160 and the insulating plate 170 may be on a lower surface of the cap plate 180. The insulating plate 170 may be on the lower surface of the cap plate 180 and may be formed of an insulative material, which, for example, is the same as the material from which the gasket 185 is made.

A second terminal through hole 171, in which the electrode pin 182 is inserted, is formed at a location corresponding to the first terminal through hole 181 of the cap plate 180. An accommodation groove 173, having a size corresponding to a size of the terminal plate 160, is formed in a lower surface of the insulating plate 170 in order to accommodate the terminal plate 160.

The terminal plate 160 includes a conductive material (e.g., nickel (Ni)) and is coupled to the lower surface of the insulating plate 170. As a result, an electrical path may be formed between the electrode pin 182 and the second electrode plate 135. One side of the terminal plate 160 electrically contacts the second electrode plate 135. Another side of the terminal plate 160 may electrically contact the electrode pin 182. For example, a third terminal through hole 161, in which the electrode pin 182 is inserted, is at a location corresponding to the first terminal through hole 181 of the cap plate 180. Because the electrode pin 182 is insulated by the gasket 185 and is coupled via the first terminal through hole 181 of the cap plate 180, the terminal plate 160 is electrically insulated from the cap plate 180 and then electrically connected to the electrode pin 182.

In one embodiment, the cap plate 180 may include a first anchor 183 and a second anchor 186, protruding from the lower surface of the cap plate 180, to fix the terminal plate 160 and the insulating plate 170. Because the anchors 183 and 186 fix the position of the terminal plate 160 and/or the insulating plate 170, an electrical short may be prevented. In another embodiment, only one of the anchors may be included for fixing the position of the terminal plate 160 and/or the insulating plate 170 for preventing a short.

Figure 4:
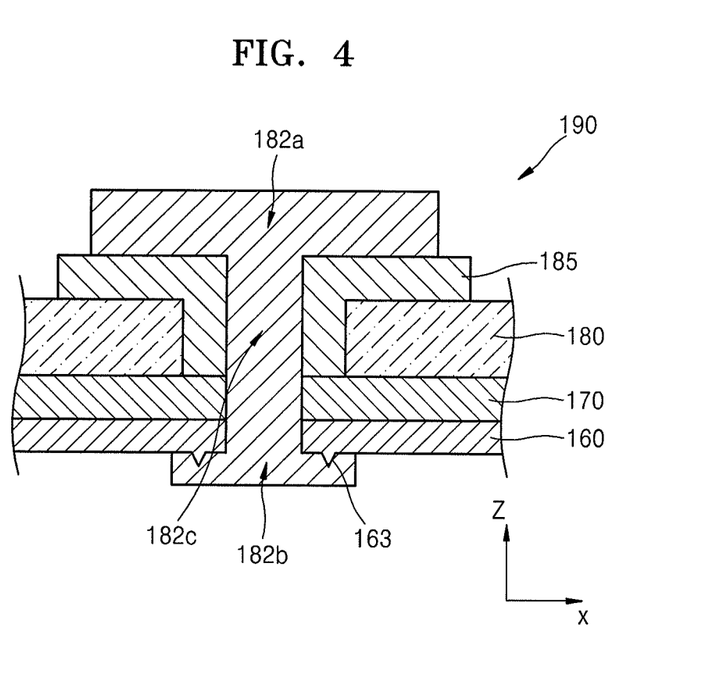
FIG. 4 illustrates the cap assembly along section line VI-VI' in FIG. 3.

FIG. 4 is a cross-sectional view illustrating a portion taken along a line VI-VI' in FIG. 3. In particular, FIG. 4 illustrates an enlarged cross-section of the cap assembly 190 including the terminal plate 160, the insulating plate 170, and the cap plate 180, which are arranged based on the electrode pin 182.

Referring to FIG. 4, the cap assembly 190 includes the terminal plate 160, the insulating plate 170, the cap plate 180, and the electrode pin 182. The cap plate 180 has the first terminal through hole 181, the insulating plate 170 has the second terminal through hole 171, and the terminal plate 160 has the third terminal through hole 161. The electrode pin 182 is inserted into the first terminal through hole 181, the second terminal through hole 171, and the third terminal through hole 161.

A protrusion 163 may be formed on a neighboring or adjacent portion of the third terminal through hole 161 of the terminal plate 160. Because one surface of the terminal plate 160 contacts the insulating plate 170, the protrusion 163 may be on the other surface of the terminal plate 160. For example, the protrusion 163 may be on a surface opposite to the surface on which the terminal plate 160 contacts the insulating plate 170.

Further, as illustrated in FIG. 4, the electrode pin 182 (which is inserted into the first terminal through hole 181, the second terminal through hole 171, and the third terminal through hole 161) includes an upper portion 182a on the upper surface of the cap plate 180, a lower portion 182b on the lower surface of the terminal plate 160, and a connecting portion 182c coupled between the upper portion 182a and the lower portion 182b. The upper portion 182a of the electrode pin 182 contacts the upper surface of the cap plate 180. The lower portion 182b of the electrode pin 182 contacts the lower surface of the terminal plate 160. The upper portion 182a of the electrode pin 182 may be on the upper surface of the cap plate 180, with the gasket 185 interposed therebetween. As described above, because the cap plate 180 and the electrode pin 182 are formed of metallic materials and have different polarities, the gasket 185 is arranged to prevent an electrical short on the surface on which the upper portion 182a of the electrode pin 182 contacts the upper surface of the cap plate 180.

The protrusion 163 may be on the lower surface of the terminal plate 160, at a location where the lower surface of the terminal plate 160 contacts the lower portion 182b of the electrode pin 182. Therefore, the lower portion 182b of the electrode pin 182 is arranged to interlock with the protrusion 163 of the terminal plate 160. Adhesion between the lower portion 182b of the electrode pin 182 and the terminal plate 160 may be greatly improved due to the protrusion 163 formed on the terminal plate 160. A contact resistance problem between the surface of the lower portion 182b of the electrode pin 182 (which contacts the lower surface of the terminal plate 160) may be solved, thereby improving reliability of the secondary battery.

Figure 5:
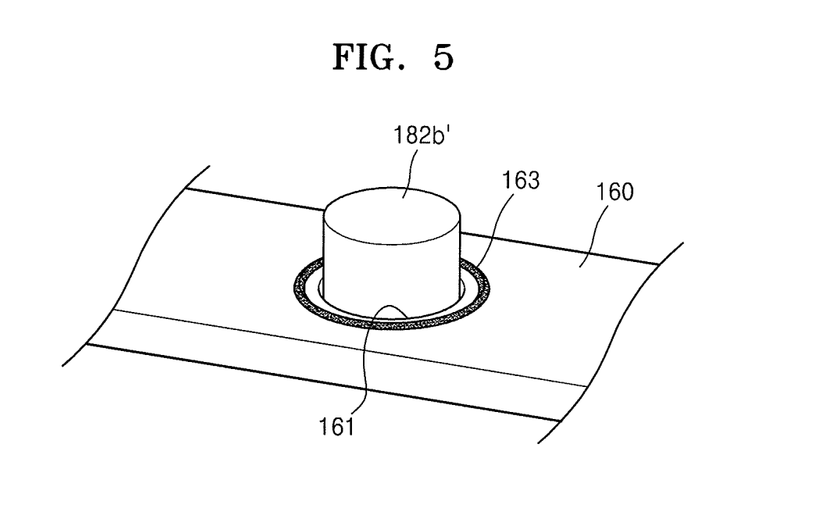
FIGS. 5 to 7 illustrate enlarged portions of embodiments of a terminal plate.
Figure 6:
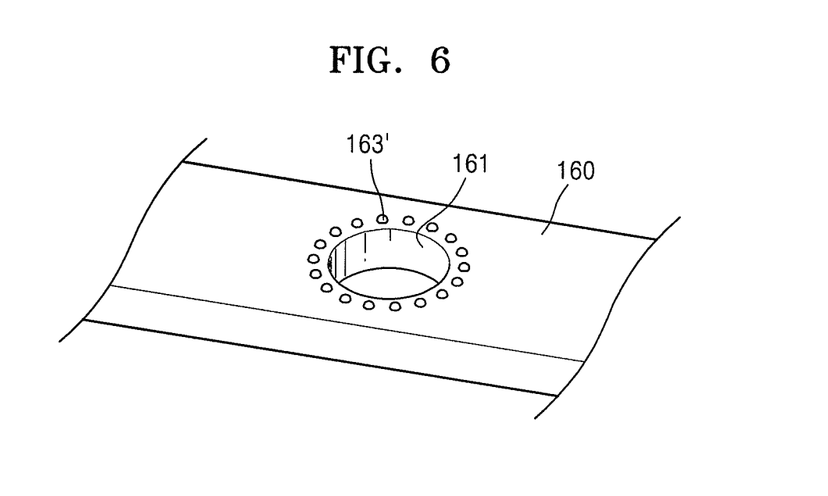
Figure 7:
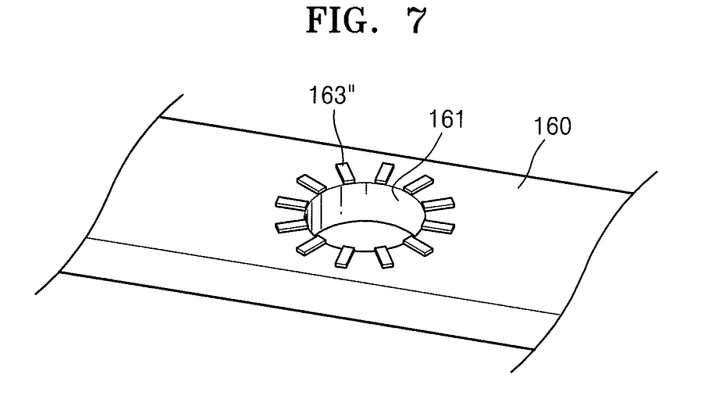

FIGS. 5 to 7 illustrate different embodiments of the terminal plate 160 of the secondary battery 100 in FIG. 1.

Referring to FIG. 5, the protrusion 163 on the lower surface of the terminal plate 160 has a predetermined (e.g., circular) shape and surrounds the third terminal through hole 161 of the terminal plate 160.

Referring to FIG. 6, a plurality of protrusions 163' may be on the terminal plate 160 and may surround an adjacent or neighboring portion of the third terminal through hole 161 of the terminal plate 160.

Referring to FIG. 7, protrusions 163" on the lower surface of the terminal plate 160 may be radially arranged based on the third terminal through hole 161 of the terminal plate 160.

Due to the aforementioned protrusions on the terminal plate 160, adhesion between the lower portion 182b of the electrode pin 182 and the terminal plate 160 may be greatly improved. Also, a contact resistance problem, on the surface on which the lower portion 182b of the electrode pin 182 and the terminal plate 160 are formed, may be solved, thereby improving reliability of the secondary battery.

Figure 8:
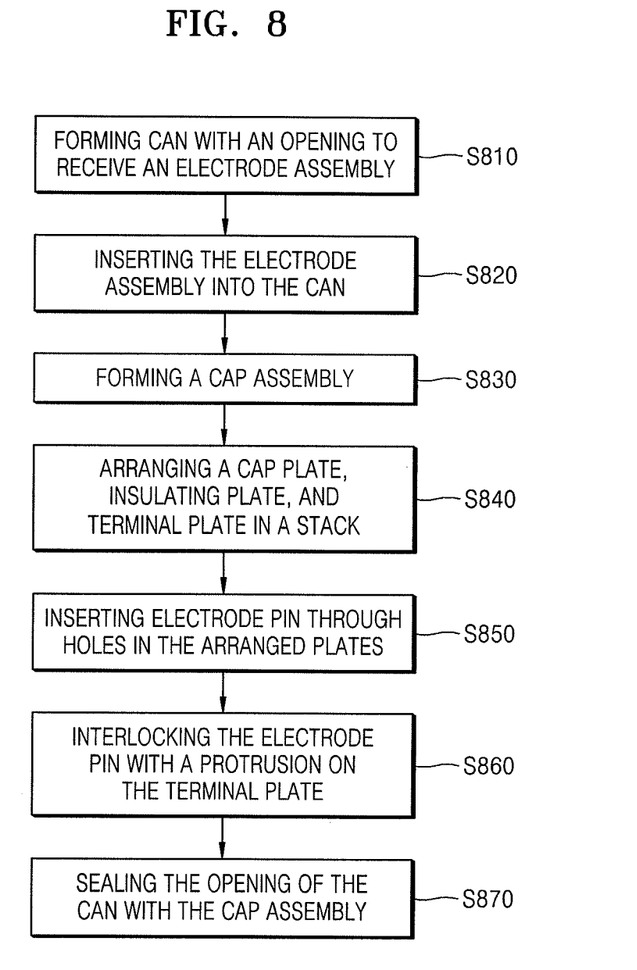
FIG. 8 illustrates a method for manufacturing a secondary battery.

FIG. 8 illustrates operations included in a method for manufacturing a secondary battery, which, for example, may be the secondary battery in FIGS. 1 to 7. The method includes forming a can 110 having a predetermined shape (e.g., similar to a hexahedron) and an opening OP on a side of the can 110 (S810). The can 110 is formed to include, for example, metallic materials (e.g., Al or Al alloy) to secure sufficient strength.

Then, an electrode assembly 130 is housed in the can 110 (S820). The electrode assembly 130 may include a first electrode layer 131, a second electrode layer 132, and a separator 133 between the first electrode layer 131 and the second electrode layer 132. The electrode assembly 130 may have a structure in which first multiple electrode layers 131, second electrode layers 132, and separators 133 are stacked, or a jelly-roll structure in which the first electrode layer 131, the second electrode layer 132, and the separator 133 are wrapped.

A cap assembly 190 may be formed to include a cap plate 180, an insulating plate 170, a terminal plate 160, and an electrode pin 182 (S830). Formation of the cap assembly may include arranging the insulating plate 170 on a lower surface of the cap plate 180, and the terminal plate 160 on a lower surface of the insulating plate 170 (S840). Then, the electrode pin 182 may be inserted into terminal through holes 181, 171, and 161 respectively formed in the cap plate 180, the insulating plate 170, and the terminal plate 160 (S850).

Referring to FIG. 5, the electrode pin 182 is formed of metallic materials which have ductility and malleability. An end of the electrode pin 182, which is inserted into the terminal plate 160 using the malleability of the metallic materials, may be formed, for example, by a spinning method. An end portion 182b' of the electrode pin 182, which is formed by the spinning method, may contact a surface on a neighboring portion of the terminal through hole 161 of the terminal plate 160.

A protrusion 163 is formed on a surface of the terminal plate 160, at a location where the end portion 182b' of the electrode pin 182 contacts the surface of the terminal plate 160. The protrusion 163 is formed on the surface of the terminal plate 160. The surface is opposite to a surface of the terminal plate 160 which contacts the insulating plate 170.

The protrusion 163 may be formed on the neighboring portion of the terminal through hole 161 of the terminal plate 160. The end portion 182b' of the electrode pin 182, which extends during spin coating due to the malleability of the metallic materials and which contacts the neighboring portion of the terminal through hole 161 of the terminal plate 160, may interlock with the protrusion 163 (S860).

After the cap assembly 190 is formed, the opening OP of the can 110 may be sealed using the cap assembly 190 (S870). A part on which the cap assembly 190 and the can 110 contact may be sealed, for example, by laser welding to form an internal airtight coupling.

Due to the protrusion 163 formed on the terminal plate 160 of the secondary battery 110, adhesion between the lower portion 182b of the electrode pin 182 and the terminal plate 160 may be improved. As a result, a contact resistance problem on the surface on which the lower portion 182b of the electrode pin 182 and the terminal plate 160 are formed may be solved, thereby improving reliability of the secondary battery.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present invention as set forth in the following claims.

What is claimed is:

1. A secondary battery, comprising:
an electrode assembly including a separator between a first electrode plate and a second electrode plate;
a can housing the electrode assembly and including an opening;
a cap plate to seal the opening of the can and including a first terminal through hole;
an insulating plate on a lower surface of the cap plate and including a second terminal through hole;
a terminal plate on a lower surface of the insulating plate and including a third terminal through hole and a protrusion adjacent the third terminal through hole, the protrusion having a base at a surface the terminal plate and a distal surface spaced apart from the surface of the terminal plate, the distal surface having a continuous circular shape that surrounds the third terminal through hole, and
an electrode pin on an upper surface of the cap plate and inserted into the first, second, and third terminal through holes, and having a metallic material which has malleability, wherein:
the third terminal through hole has a continuous circular shape that surrounds the electrode pin,
the electrode pin includes an upper portion on the upper surface of the cap plate, an end portion, and a connecting portion that connects the upper portion and the end portion,
the connecting portion of the electrode pin has a cylindrical shape that is fully filled inside,
the end portion of the electrode pin directly contacts the surface of the terminal plate and the protrusion, and is formed from an end of the fully-filled connecting portion by a spinning method using the malleability of the metallic material such that the end portion continuously contacts the continuous circular shape of the distal surface of the protrusion,
the cap plate includes a first anchor and a second anchor protruding from the lower surface of the cap plate to fix a position of the insulating plate, the second anchor being larger than the first anchor and being positioned closer to the electrode pin than the first anchor,
the insulating plate includes a first recess at one end and a second recess at another end which receive the first anchor and the second anchor, respectively, and
the insulating plate includes an accommodation groove which has a size corresponding to a size of the terminal plate, and is formed in a lower surface of the insulating plate in order to accommodate the terminal plate.

2. The secondary battery as claimed in claim 1, wherein:
the terminal plate includes a first surface which includes the protrusion and a second surface which contacts the insulating plate, and
the first surface is opposite to the second surface.

3. The secondary battery as claimed in claim 1, wherein the end portion of the electrode pin interlocks with the protrusion of the terminal plate.

4. A method for manufacturing a secondary battery, the method comprising:
inserting an electrode assembly into a can;
forming a cap assembly; and
sealing the can with the cap assembly,
wherein forming the cap assembly includes:
(a) arranging a cap plate, an insulating plate on a lower surface of the cap plate, and a terminal plate on a lower surface of the insulating plate in a stack, the cap plate, the insulating plate, and the terminal plate each having a terminal through hole to receive an electrode pin, wherein the cap plate includes a first anchor and a second anchor protruding from the lower surface of the cap plate to fix a position of the insulating plate, the second anchor being larger than the first anchor and being positioned closer to the electrode pin than the first anchor, wherein:
  a protrusion is located on a surface of the terminal plate, the protrusion having a base at the surface the terminal plate and a distal surface spaced apart from the surface of the terminal plate, the distal surface having a continuous circular shape that surrounds the terminal through hole in the terminal plate, and
  the terminal through hole in the terminal plate has a continuous circular shape that surrounds the electrode pin,
(b) inserting the electrode pin into the terminal through holes in the cap plate, the insulating plate, and the terminal plate, wherein:
  the electrode pin include a metallic material,
  the electrode pin includes an upper portion on an upper surface of the cap plate, an end portion, and a connecting portion that connects the upper portion and the end portion,
  the connecting portion of the electrode pin has a cylindrical shape that is fully filled inside; and
(c) interlocking the end portion of the electrode pin with the protrusion of the terminal plate by a spinning method based on malleability of the metallic material, the end portion being formed from an end of the fully-filled connecting portion, and being formed such that the end portion continuously contacts the continuous circular shape of the distal surface of the protrusion,
wherein the insulating plate includes an accommodation groove which has a size corresponding to a size of the terminal plate, and is formed in a lower surface of the insulating plate in order to accommodate the terminal plate.

5. A secondary battery, comprising:
a can housing an electrode assembly; and
a cap assembly coupled to the can and including:
a cap plate including a first hole;
an insulating plate on the cap plate and including a second hole;
a terminal plate on the insulating plate and including a third hole and a protrusion adjacent the third hole, wherein the protrusion has a first shape, and the protrusion has a base at a surface the terminal plate and a distal surface spaced apart from the surface of the terminal plate, the distal surface having a continuous circular shape that surrounds the third hole; and
an electrode pin inserted into the first, second, and third holes, the electrode pin having a metallic material which has malleability, wherein:
the third hole has a continuous circular shape that surrounds the electrode pin,
the electrode pin includes an upper portion on an upper surface of the cap plate, an end portion, and a connecting portion that connects the upper portion and the end portion,
the connecting portion of the electrode pin has a cylindrical shape that is fully filled inside,
the end portion of the electrode pin directly and continuously contacts the surface of the terminal plate and the continuous circular shape of the distal surface of the protrusion, and is formed from an end of the fully-filled connecting portion to have a second shape coupled to the first shape of the protrusion by a spinning method using the malleability of the metallic material,
the cap plate includes a first anchor and a second anchor protruding from a lower surface of the cap plate to fix a position of the insulating plate, the second anchor being larger than the first anchor and being positioned closer to the electrode pin than the first anchor,
the insulating plate includes a first recess at one end and a second recess at another end which receive the first anchor and the second anchor, respectively, and
the insulating plate includes an accommodation groove which has a size corresponding to a size of the terminal plate, and is formed in a lower surface of the insulating plate in order to accommodate the terminal plate.

6. The secondary battery as claimed in claim 5, wherein the first shape is complementary to the second shape.

7. The secondary battery as claimed in claim 6, wherein the first, second, and third holes have first diameters to accommodate the electrode pin, which has a second diameter less than each of the first diameters.

8. The secondary battery as claimed in claim 5, further comprising:
  a gasket in at least one of the first, second, or third holes.

* * * * *